United States Patent
Rohde

(10) Patent No.: US 9,798,764 B2
(45) Date of Patent: Oct. 24, 2017

(54) IDENTIFYING RECURRING SEQUENCES OF USER INTERACTIONS WITH AN APPLICATION

(71) Applicant: salesforce.com, inc.

(72) Inventor: Sönke Rohde, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 360 days.

(21) Appl. No.: 14/571,040

(22) Filed: Dec. 15, 2014

(65) Prior Publication Data

US 2015/0178348 A1    Jun. 25, 2015

Related U.S. Application Data

(60) Provisional application No. 61/919,086, filed on Dec. 20, 2013.

(51) Int. Cl.
*G06F 17/30* (2006.01)
*H04L 29/08* (2006.01)

(52) U.S. Cl.
CPC .. *G06F 17/30377* (2013.01); *G06F 17/30867* (2013.01); *H04L 67/306* (2013.01)

(58) Field of Classification Search
CPC ......... G06F 17/30377; G06F 17/30867; H04L 67/306
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |

(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

*Primary Examiner* — Huawen A Peng
(74) *Attorney, Agent, or Firm* — Weaver Austin Villeneuve & Sampson LLP

(57) ABSTRACT

Disclosed are database systems, computing devices, methods, and computer program products for identifying recurring sequences of user interactions with an application. In some implementations, a server of a database system provides a user interface of the application for display at a computing device. The database system stores data objects identifying a first plurality of user interactions with the application. The server receives information representing a second plurality of user interactions with the application. The server updates the database system to further identify the second user interactions. The server identifies a recurring sequence of user interactions from the first and second user interactions as resulting in a first target state of the application. The server updates the database system to associate the recurring sequence of user interactions with the first target state of the application.

20 Claims, 10 Drawing Sheets

(56) References Cited

U.S. PATENT DOCUMENTS

| | | |
|---|---|---|
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zuckerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |

(56) References Cited

U.S. PATENT DOCUMENTS

| | | |
|---|---|---|
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0136947 A1* | 5/2014 | Naick ............... G06F 17/30905 715/234 |
| 2014/0359537 A1 | 12/2014 | Jackobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |

\* cited by examiner

IDENTIFYING RECURRING SEQUENCES OF USER INTERACTIONS WITH AN APPLICATION

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

PRIORITY DATA

This patent document claims priority to and commonly assigned U.S. Provisional Patent Application No. 61/919,086, titled "Adaptive Navigation for Recurring Click Paths," by Sönke Rohde, filed on Dec. 20, 2013, which is hereby incorporated by reference in its entirety and for all purposes.

TECHNICAL FIELD

This patent document relates generally to providing services in an on-demand services environment using a database system and, more specifically, to techniques for identifying recurring sequences of user interactions with an application.

BACKGROUND

"Cloud computing" services provide shared resources, software, and information to computers and other devices upon request. In cloud computing environments, software can be accessible over the Internet rather than installed locally on in-house computer systems. Cloud computing typically involves over-the-Internet provision of dynamically scalable and often virtualized resources. Technological details can be abstracted from the users, who no longer have need for expertise in, or control over, the technology infrastructure "in the cloud" that supports them.

Database resources can be provided in a cloud computing context. However, using conventional database management techniques, it is difficult to know about the activity of other users of a database system in the cloud or other network. For example, the actions of a particular user, such as a salesperson, on a database resource may be important to the user's boss. The user can create a report about what the user has done and send it to the boss, but such reports may be inefficient, not timely, and incomplete. Also, it may be difficult to identify other users who might benefit from the information in the report.

BRIEF DESCRIPTION OF THE DRAWINGS

The included drawings are for illustrative purposes and serve only to provide examples of possible structures and operations for the disclosed inventive systems, apparatus, methods and computer program products for identifying recurring sequences of user interactions with an application. These drawings in no way limit any changes in form and detail that may be made by one skilled in the art without departing from the spirit and scope of the disclosed implementations.

DETAILED DESCRIPTION

Figure 1:
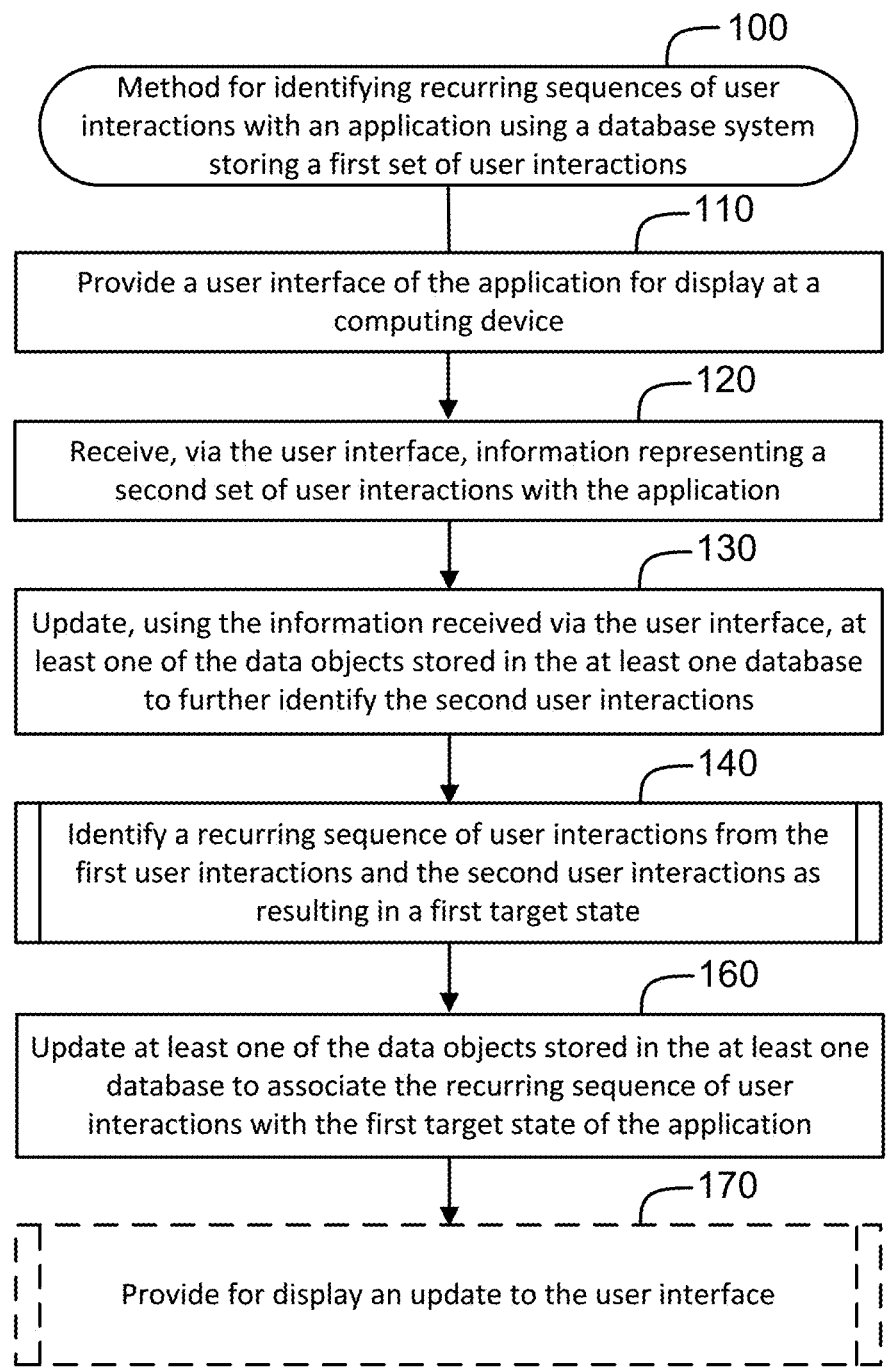
FIG. 1 shows a flowchart of an example of a method 100 for identifying recurring sequences of user interactions with an application, performed in accordance with some implementations.

Examples of systems, apparatus, methods and computer-readable storage media according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Some implementations of the disclosed systems, apparatus, methods and computer program products relate to identifying recurring sequences of user interactions with an application and generating shortcuts for the identified recurring sequences. Any number of user selections and other types of user input are often required to navigate conventional user interfaces of conventional applications to access frequently used features. Many conventional user interfaces and applications are not able to be configured or reconfigured to adapt to patterns of input by individual users. Thus, users are left to waste time and energy tapping or clicking the same sequence of user input or otherwise navigating through the same sequence of steps in a flow every time the user wishes to access or interact with a given feature of the application.

Some of the disclosed implementations provide adaptive navigation to improve the accessibility of frequently used features of the application and eliminate wasteful clicks or interactions. For example, when a user repeats the same click path or other sequence of interactions with the application a designated number of times (e.g., 5 times) in a row, or in most cases (e.g., 8 out of 10 times), the application may be programmed to make the destination of that click path a "hot target" or a "target state" of the application that may be directly accessible upon displaying the user interface. In some implementations, the target state of the application can be a feature as described above such as a computing event or combination of events, a service or combination of services, a designated user interface, a scroll position or zoom level of a user interface, or some combination thereof. For example, a link to the target state of the application may be displayed in a navigation sidebar or a dashboard of the application for quick access upon opening the application. Thus, for instance, with a single tap or click of the link, the user can access a feature of the application rather than making multiple selections otherwise needed to access the feature.

As an example, a user may tap three user interface elements in series such as "Search," then "Task," then "My Tasks" five times in a row after opening an application on a mobile device ("app"). This recurring sequence of interactions (or recurring click path) may be detected by the mobile device or by a server hosting the app. As a result of the detection, "My Tasks" may be identified as a target state of the app, and a "My Tasks" link may be added to a main navigation user interface. In touch environments, such a link may be removed by using a designated gesture, such as the tap-hold gesture, which surfaces an 'X' or delete icon on the user interface. A user may then remove the link by selecting the 'X' or delete icon. In some implementations, target states identified by links may be modified as well by using a designated gesture and adding one or more interactions to the sequence represented by the link.

By way of illustration, an administrator or developer may set one or more thresholds for adaptive navigation, causing a link for a target state to be automatically generated based on a number of recurring click paths meeting or exceeding a threshold. One or a combination of parameters can specify such a threshold, such as a minimum number of occurrences of the recurring click path and/or a designated timeframe within which the recurring click path occurs. In some implementations, the viewing user of the application may enter user input to toggle the capability of automatically generating links to hot targets and may configure thresholds through a user interface. In some implementations, hot targets may be auto-generated based on default thresholds, that is, without being configured by user input.

In some implementations, analyzing how users interact with an application and identifying recurring sequences of interactions within an application may provide insight into the usability of the application. For example, if the most frequently accessed states of the application require many steps to access, this may be an indication that the application has low usability and that a user may experience significant friction trying to use the application. With this information, an administrator and/or developer of the application may reconfigure the states and navigation to optimize the user experience of the application.

FIG. 1 shows a flowchart of an example of a method 100 for identifying recurring sequences of user interactions with an application, performed in accordance with some implementations. In FIG. 1, at block 110, a user interface of an application is provided for display at a user's computing device. In some implementations, a server of a database system hosting the application sends data to the computing device, where the data is processed to generate and display the user interface, for instance, using a browser program installed on the computing device. In some other implementations, the application is hosted at the user's computing device. In some implementations, the application may be a web application hosted by a server, while in other implementations, the application may be a mobile application ("app") running locally on the user's computing device. In some other implementations, the application may be a desktop application running on a laptop or desktop computer.

Non-limiting examples of the user's computing device include a touchscreen-equipped device such as a smartphone or tablet, a wearable device, a laptop computer, or a desktop computer. The computing device may be configured to receive input via a finger or stylus contacting a touchscreen of the computing device. In some implementations, the computing device may receive input via an input device, such as a mouse or a keyboard. In other implementations, the computing device may receive input via a gesture or a motion, or a voice command.

In some implementations, the database system stores data objects that identify a first set of user interactions with the application. The user interactions stored in the database system may identify some or all of a user's interactions with the application over a period of time. As an example, the database system may store every interaction that the user performs with the application. Examples of user interactions with the application may include selecting a link in the user interface of the application, completing a field, one or more keystrokes, one or more mouse gestures, one or more finger or hand gestures, a change in the scroll position for the user interface, or a change in a zoom level for the user interface. Another example of a user interaction may be submitting a request to, for example, perform a search, open a record, open a file, and the like.

In FIG. 1, at block 120, the server receives, via the user interface of the application, information representing a second set of user interactions with the application. By way of example, as the user interacts with the application, the computing device may transmit the user's interactions with the application to a server. The server may use these transmitted user interactions along with the previously stored user interactions to determine whether there has been a recurring sequence of user interactions for the user. In FIG. 1, at block 130, the server updates the database to store the second user interactions. The second user interactions may be stored in the database as one or more data objects of the database. In FIG. 1, at block 140, the server identifies a recurring sequence of user interactions based on the interactions stored in the database. The interactions stored in the database may include the user interactions that were previously stored, as well as the user interactions that were provided in blocks 120 and 130.

The identified recurring sequence of user interactions may result in a first target state for the application. In some implementations, the first target state of the application may be defined by an associated uniform resource locator (URL). In other implementations, the first target state may be further defined by a scroll position for the user interface, or a zoom level for the user interface. As an example, a target state for the application may be a record detail page for a particular record that may be displayed in the application. If the record detail display spans multiple pages in the user interface, the target state may also include a particular page for the record detail display. Alternatively, the target state may be a list of one or more related records, such as customer relationship management (CRM) records. For instance, the target state may list the cases related to a particular account. If a user regularly looks up the list of cases related to the account, the displayed list may be a target state for the application.

As another example, the target state for the application may identify a particular file stored in a database of the database system. The target state could also include a particular scroll position or a zoom level for the file. For example, if the file includes multiple pages that may be scrolled through in the user interface, the target state could include a particular page of the file that the user scrolled to in the user interface. The target state could also include the zoom level at which the user was viewing the page of the file.

In another example, the target state for the application may include the search results for a particular search. For example, a user may be interested in whether another user has posted about some particular words in his information feed. The user may, whenever he logs in to his feed application, perform a search based on the particular words, and look through the results. If the system detects that this user does this every day, a shortcut could be provided to the user to perform that search in one click.

In some implementations, the target state of the application may include any state that may be reached through one or more user interactions with the application, such as a series of selections or searches. As an example, a user of a customer relationship management (CRM) system may frequently, upon opening a CRM application, search for a particular account, like Acme Inc., and view the list of opportunities associated with that particular account. Each time, the user may need to open up an account search page, enter "Acme" in the search field, select Acme Inc. from the resulting search results, and clicking on a link to display the opportunities for Acme Inc. This list of actions may be the recurring sequence user interactions that results in the target state, which is the list of opportunities associated with the Acme account.

Figure 4:
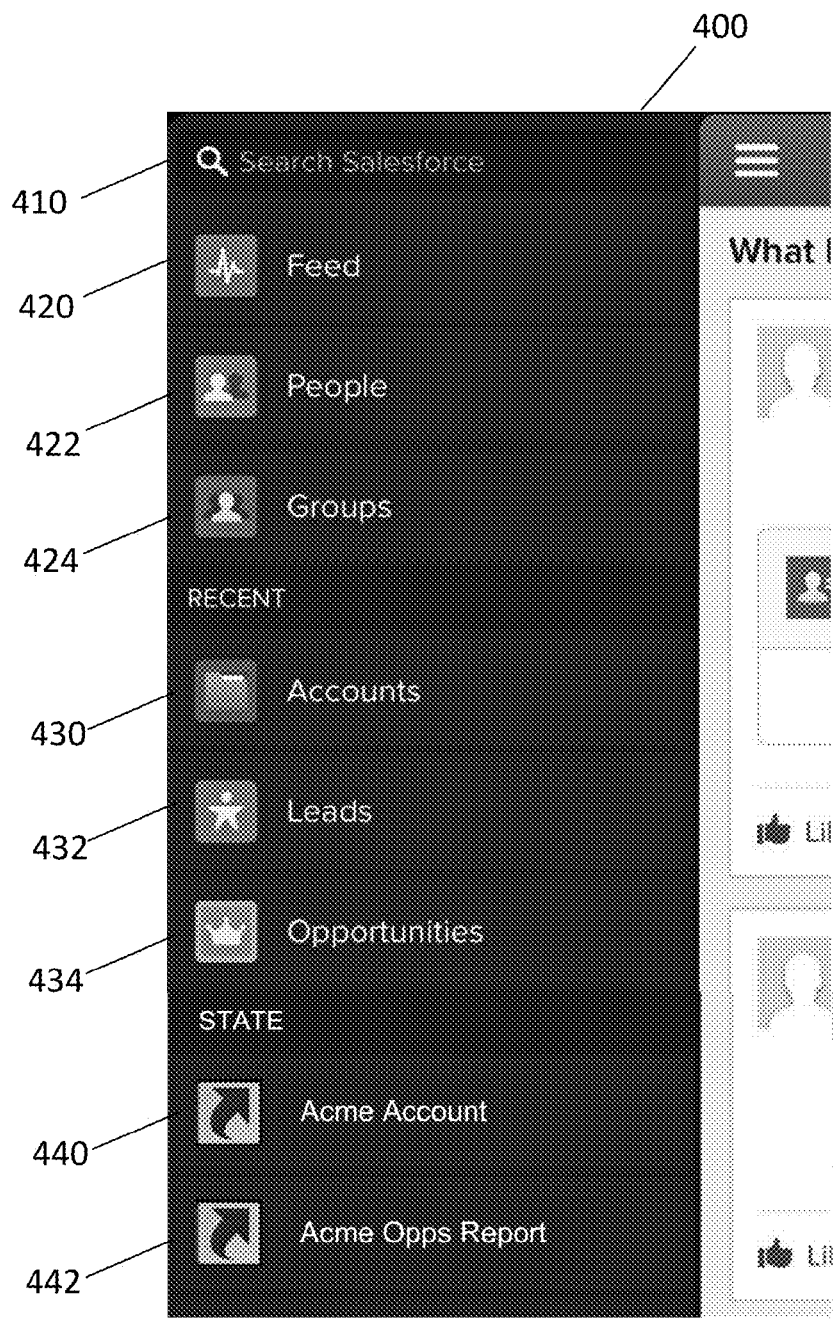
FIG. 4 shows an example of a navigation user interface 400 of a mobile application, in accordance with some implementations.

FIGS. 4-7 provide examples of recurring sequences of user interactions resulting in various target states. FIG. 4 shows an example of a navigation user interface 400 of a mobile application, in accordance with some implementations. The navigation user interface 400 allows a user of the mobile application to access various states of the application. When a user opens up the mobile application, the application may initially provide for display the navigation user interface 400. The navigation user interface 400 includes links 420, 422, 424 to the user's feed, to a list of people associated with the user, and to a list of groups associated with the user. The navigation user interface 400 also includes links 430, 432, 434 to accounts, leads, and opportunities that have been recently viewed by the user. Selecting the Accounts link 430 may lead the user to a user interface that displays the accounts that the user has most recently interacted with as well as a search field to search for a particular account. The navigation user interface 400 includes target state links 440 and 442, which refer to target states for recurring sequences of user interactions. The navigation user interface 400 may also include a search field 410 for searching the database system of the application.

Figure 5:
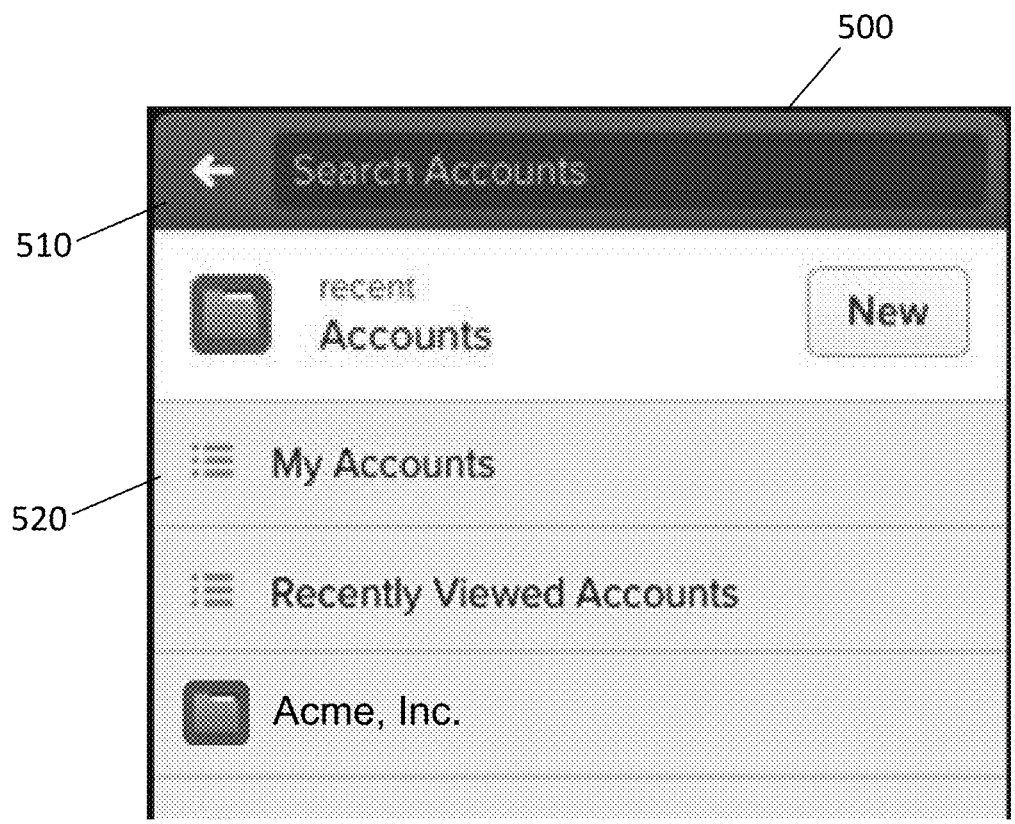
FIG. 5 shows an example of a search interface 500 of a mobile application, in accordance with some implementations.
Figure 6:
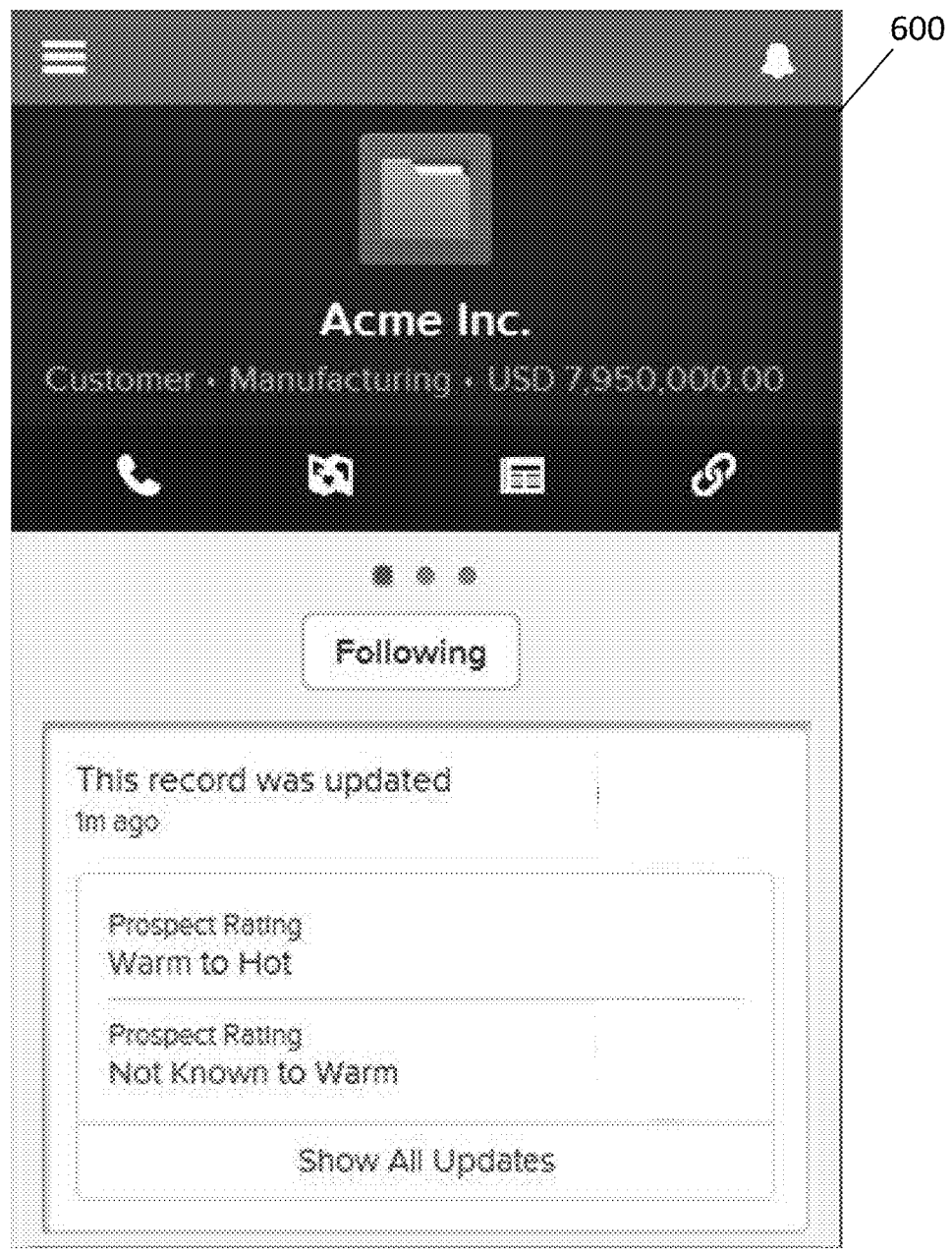
FIG. 6 shows an example of an account information interface 600 of a mobile application, in accordance with some implementations.
Figure 7:
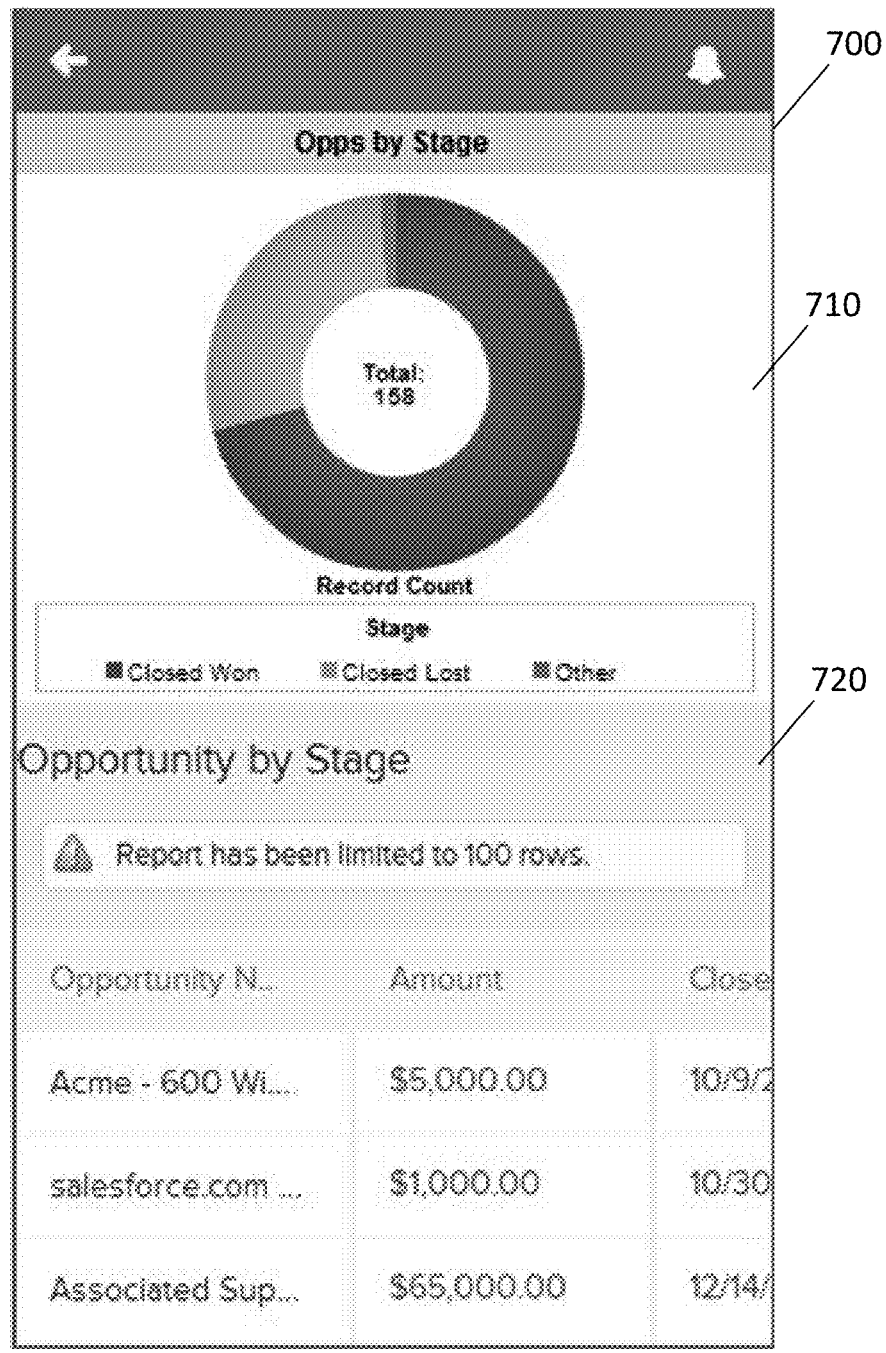
FIG. 7 shows an example of an opportunity report user interface 700 of a mobile application, in accordance with some implementations.

The "Acme Account" target state link 440 may lead the user directly to the Acme account details page. The "Acme Opps Report" target state link 442 may lead the user directly to an Opportunities Report for the Acme account. These target state links 440, 442 may have been previously created based on the user accessing the Acme account detail page and the Opportunities Report frequently. FIGS. 5-7 describe how these target states may have been identified based on the user's interactions with the application.

FIG. 5 shows an example of a search interface 500 of a mobile application, in accordance with some implementations. Selecting the recent accounts link 430 of FIG. 4 may cause the account search interface 500 to be displayed on the computing device. The account search interface 500 may include a search field 510 for searching the database system for a particular account. The account search interface 500 also includes a "My Accounts" link 520 for a user to view all of the accounts he is associated with. In this example, the user may search for the Acme account by typing the term "Acme" in the search field 510 of the search interface 500.

FIG. 6 shows an example of an account information interface 600 of a mobile application, in accordance with some implementations. The account information interface 600 may include various details for the Acme account record. At this point, a server of the database system may determine that the user has performed the preceding sequence of user interactions arriving at this target state multiple times within a designated time frame. For example, the user may frequently perform the steps of searching for the Acme account record and selecting the Acme account for display in the user interface. The server may determine that the user has previously performed this sequence of steps a number of times.

In some implementations, the user may automatically identify this sequence of user interactions as a recurring sequence of user interactions resulting in a target state. In other implementations, the user may be presented with a prompt indicating that the user has performed this series of steps multiple times and asking if the user would like to identify the target state for the recurring sequence of user interactions in, for example, the navigation user interface of the application, as depicted in FIG. 4. Responding to the prompt affirmatively may cause the "Acme Account" link 440 of FIG. 4 to be displayed in the navigation user interface 400. Subsequently selecting the link 440 may lead the user directly to the Acme account information page 600 of FIG. 6.

As another example, the user viewing the Acme account information page 600 may navigate from this page to an opportunity report associated with the Acme account. FIG. 7 shows an example of an opportunity report user interface 700 of a mobile application, in accordance with some implementations. The opportunity report user interface 700 may display the set of opportunities that is associated with the Acme account in graphical 710 and tabular 720 form. It may be determined that the user has also performed the series of steps leading up to this user interface multiple times in the past: searching for the Acme account, selecting the Acme account, and opening the opportunity report. The opportunity report may then be identified as a target state for the recurring sequence of user interactions leading up to the opportunity report user interface 700. If the user has previously also scrolled down the tabular form 720 of the opportunity report to a particular opportunity, the scroll position may also be included in the target state for the recurring sequence of user interactions. The "Acme Opps Report" link 442 of FIG. 4 may be generated in response to identifying this recurring sequence of user interactions, and subsequently selecting the link 442 may lead the user directly to the opportunity report interface 700 displaying the interface at the scroll position provided by the user.

Returning to FIG. 1, at block 160, the server updates at least one of the data objects stored in the at least one database to associate the recurring sequence of user interactions with the first target state of the application. When a recurring sequence of user interactions is identified and associated with a first target state, the recurring sequence and the first target state may be stored in the database system.

In some implementations, a first user may be associated with a first set of target states corresponding to recurring sequences of user interactions performed by the first user in the application. The database system may also store a second set of target states for a second user corresponding to recurring sequences of user interactions performed by the second user in the application. Similarly, the database system may store multiple sets of target states corresponding to different users of the application. In FIG. 1, at block 170, the server provides for display an update to the user interface, as discussed further below in block 370 of FIG. 3.

Figure 2:
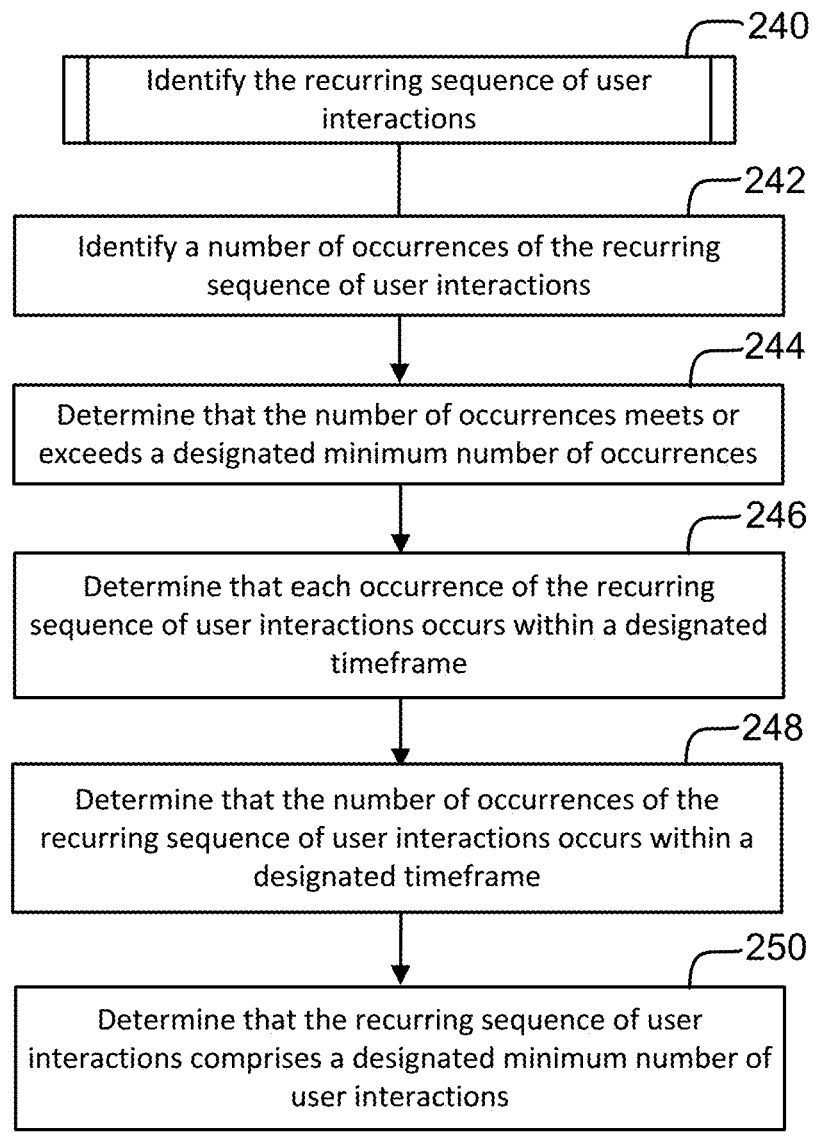
FIG. 2 shows a flowchart of an example of a method 240 for identifying recurring sequences of user interactions, performed in accordance with some implementations.

FIG. 2 shows a flowchart of an example of a method 240 for identifying recurring sequences of user interactions, performed in accordance with some implementations.

In FIG. 2, at block 242, the server performing method 240 identifies a number of occurrences of the recurring sequence of user interactions. For example, the server may determine, based on the stored user interactions, that a particular sequence of user interactions has occurred five times.

In FIG. 2, at block 244, the server performing method 240 determines that the number of occurrences for the recurring sequence of user interactions meets or exceeds a designated minimum number of occurrences. For example, the designated minimum number of occurrences may be three occurrences. This number may be determined by an administrator of the system or by the user of the application. This number may be utilized to determine what sequence lengths and associated target states should be identified by the server for potential inclusion in the navigation user interface. If the number is relatively low, then many relatively infrequent sequences could potentially be identified that would not enhance the user's navigation of the application. If the number is relatively high, then potentially very few sequences may be identified.

In FIG. 2, at block 246, the server performing method 240 determines that each occurrence of the recurring sequence of user interactions occurs within a designated timeframe. In the example of FIGS. 4-7, the sequence of interactions—searching for the Acme account, selecting the Acme account, opening the opportunity report, and scrolling to the scroll position in the opportunity list—would all need to occur within a timeframe of particular length, for example, one minute. The user may be more interested in series of interactions that are performed quickly, suggesting that the intervening states are not of particular interest to the user. In that case, the user may designate a shorter timeframe for each occurrence of the recurring sequence of interactions. In some cases, the user may designate a longer timeframe in order to identify more recurring sequences that may be occurring over longer periods of time.

In FIG. 2, at block 248, the server performing method 240 determines that the number of occurrences of the recurring sequence of user interactions occurs within a designated timeframe, which may be determined by an administrator or by the user of the application. For example, the user may be interested only in recurring sequences of user interactions that he has performed recently and may perform again in the near future. As such, a shorter timeframe would exclude older, and potentially less relevant to the user, user interactions. A shorter timeframe may also provide efficiency benefits in that a smaller corpus of user interactions would need to be analyzed to identify recurring sequences of user interactions.

In FIG. 2, at block 250, the server performing method 240 determines that the recurring sequence of user interactions comprises a designated minimum number of user interactions. The designated minimum sequence length may be determined by the user of the application. Selecting a shorter minimum sequence length may result in many short sequences being identified. Selecting a longer minimum sequence length may cause only longer recurring sequences to be identified.

Figure 3:
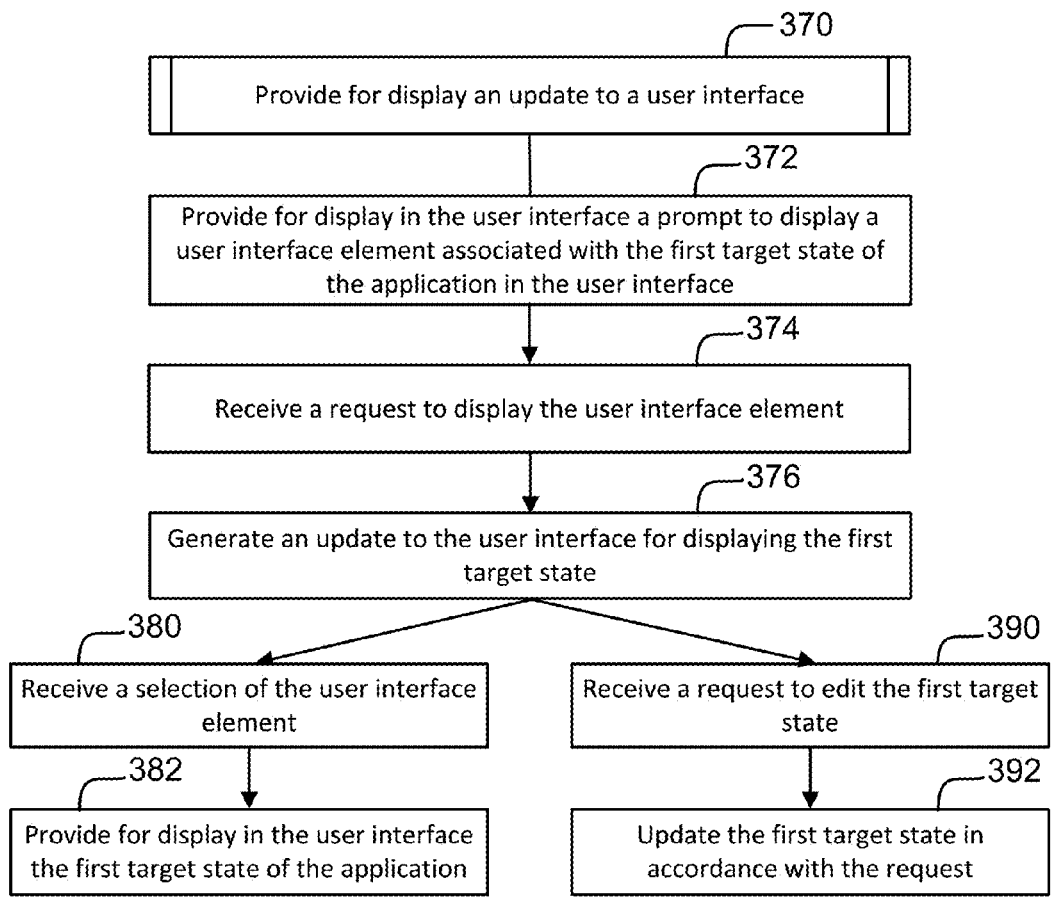
FIG. 3 shows a flowchart of an example of a method 370 for providing for display an update to a user interface, performed in accordance with some implementations.

FIG. 3 shows a flowchart of an example of a method 370 for providing for display an update to a user interface, performed in accordance with some implementations. In FIG. 3, at block 372, the server performing method 370 provides for display in the user interface a prompt to display a user interface element associated with the first target state of the application in the user interface. In some implementations, when the system identifies a recurring sequence of user interactions resulting in a target state, the application may notify the user of this recurring sequence and target state and ask the user if he would like to create a shortcut to the target state in a navigation bar of the application. The prompt may be displayed in the form of a popup in the application, a dialog box, or an indicator in the user interface that, when selected, displays the prompt.

In FIG. 3, at block 374, the server performing method 370 receives a request to display the user interface element. The user may respond affirmatively to the prompt to send the request to the server to display a user interface element in the navigation user interface.

In FIG. 3, at block 376, the server performing method 370 generates an update to the user interface for displaying the first target state. In some implementations, the update may be in the form of a user interface element provided for display in a navigation user interface component of the user interface.

In some implementations, the navigation user interface component may appear in a mobile application as illustrated in FIG. 4. In other implementations, the navigation component may appear in a dropdown menu or other interface component of the application. In a web application, the navigation component may appear in a sidebar or a tab of the user interface. In some implementations, the navigation component may also appear in a dashboard user interface for the application.

In FIG. 3, at block 380, the server performing method 370 receives a selection of the user interface element. The user viewing the navigation component may select the user interface element to navigate directly to the target state associated with the user interface element.

In FIG. 3, at block 382, the server performing method 370 provides for display in the user interface the first target state of the application. In the example of FIG. 4, the user may select the "Acme Account" link 440 to navigate directly to the Acme Account details page 600 of FIG. 6.

In FIG. 3, at block 390, the server performing method 370 receives a request to edit the first target state. The request may comprise an update to the recurring sequence of user interactions. As an example, returning to FIG. 4, the user may want to update the target state for the "Acme Opps Report" link 442 to include a particular scroll position within the report. Right-clicking or long-pressing the link 442 may cause some options to be displayed in the user interface, one of which may be to edit the target state for the link 442. In response to the request to edit the target state, the user interface may display the current target state of the user interface and allow the user to add one or more user interactions to the sequence. The user may then send a request to save the new sequence of user interactions and associate the new target state with the link 442.

In FIG. 3, at block 392, the server performing method 370 updates the first target state in accordance with the request to edit the first target state. In some implementations, the updated target state and associated sequence of user interactions may be stored in a database of the database system.

In some implementations, the server may determine, based on the one or more recurring sequences of user interactions, a usability level for the application. For example, an application in which most actions performed by a user require many user interactions to reach a target state may be determined to have a low usability level. An application with a high usability level would have a user's most common navigation destinations just a few user interactions away. Analyzing one or more users' interactions with an application and identifying recurring sequences of user interactions, and in particular, the lengths of those recurring sequences, may help determine the usability of the application. This may allow an administrator of the system to reconfigure the application to make the paths to the frequently visited target states require fewer user interactions.

Systems, apparatus, and methods are described below for implementing database systems and enterprise level social and business information networking systems in conjunction with the disclosed techniques. Such implementations can provide more efficient use of a database system. For instance, a user of a database system may not easily know when important information in the database has changed, e.g., about a project or client. Such implementations can provide feed tracked updates about such changes and other events, thereby keeping users informed.

By way of example, a user can update a record in the form of a CRM object, e.g., an opportunity such as a possible sale of 1000 computers. Once the record update has been made, a feed tracked update about the record update can then automatically be provided, e.g., in a feed, to anyone subscribing to the opportunity or to the user. Thus, the user does not need to contact a manager regarding the change in the opportunity, since the feed tracked update about the update is sent via a feed to the manager's feed page or other page.

Figure 8A:
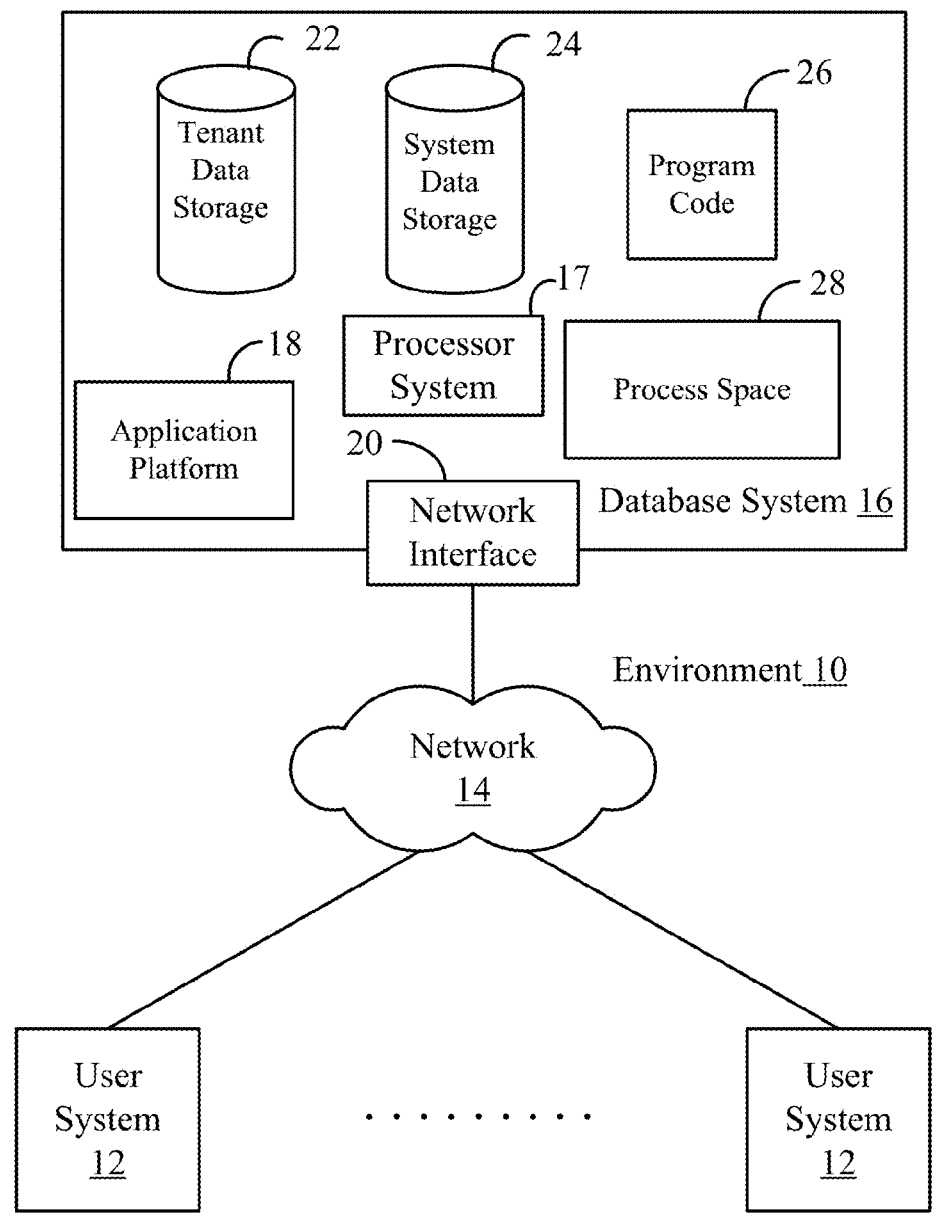
FIG. 8A shows a block diagram of an example of an environment 10 in which an on-demand database service can be used in accordance with some implementations.

FIG. 8A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 8A (and in more detail in FIG. 8B) user systems 12 might interact via a network 14 with an on-demand database service, which is implemented in the example of FIG. 8A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a number of servers. At least for users accessing system 16, each of the servers has access to the MTS' data; however, other alternative configurations may be used instead.

In one implementation, system 16, shown in FIG. 8A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 9A:
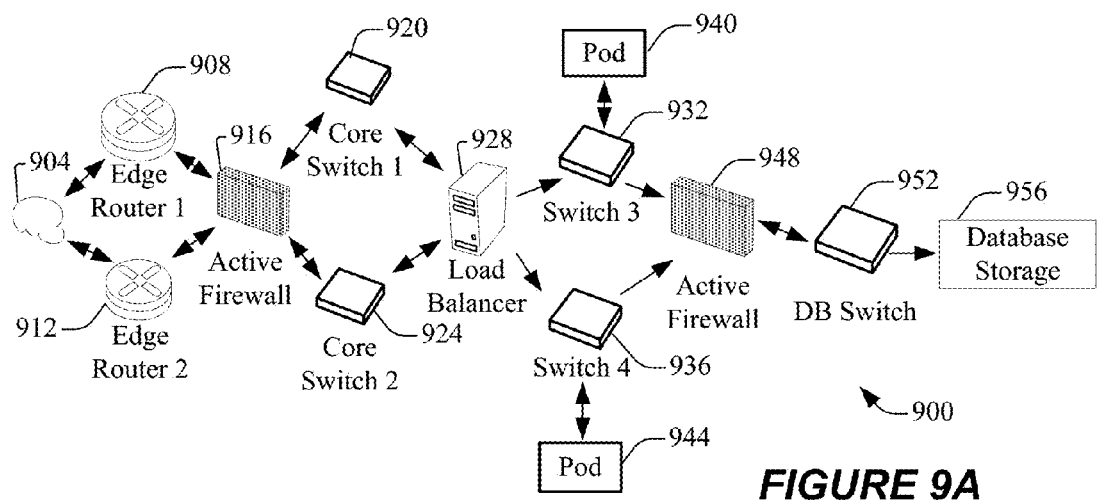
FIG. 9A shows a system diagram of an example of architectural components of an on-demand database service environment 900, in accordance with some implementations.
Figure 9B:
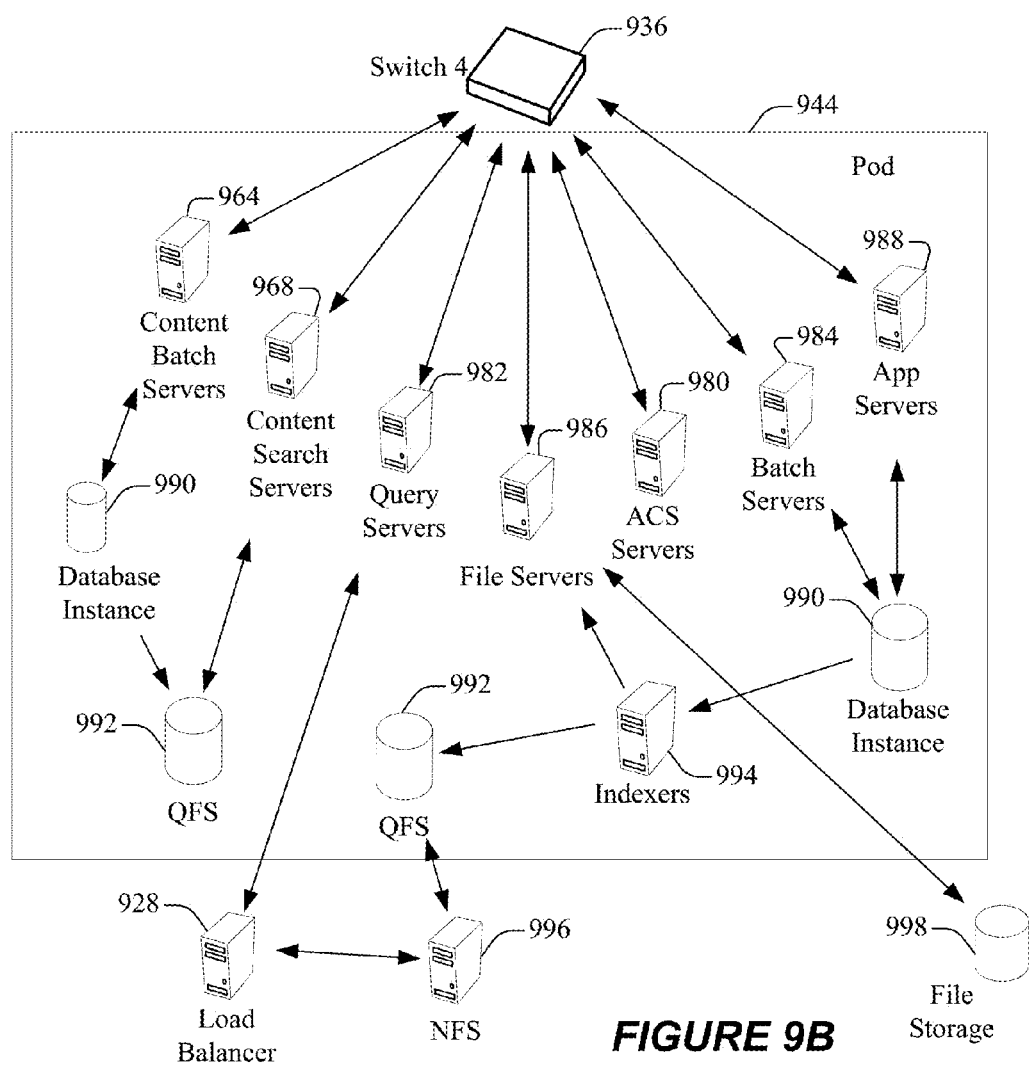
FIG. 9B shows a system diagram further illustrating an example of architectural components of an on-demand database service environment, in accordance with some implementations.

One arrangement for elements of system 16 is shown in FIGS. 9A and 9B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 8A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

Figure 8B:
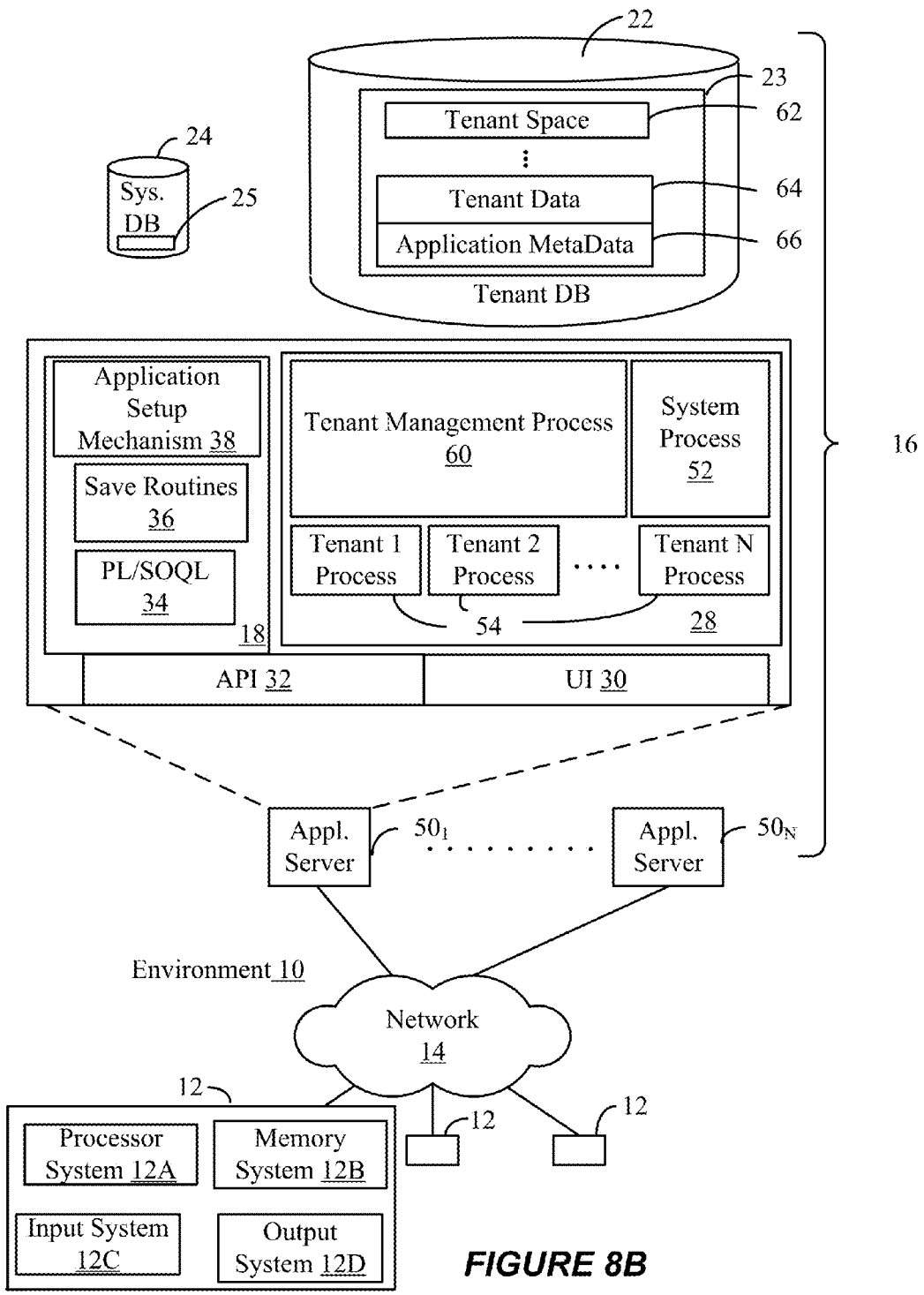
FIG. 8B shows a block diagram of an example of some implementations of elements of FIG. 8A and various possible interconnections between these elements.

FIG. 8B shows a block diagram of an example of some implementations of elements of FIG. 8A and various possible interconnections between these elements. That is, FIG. 8B also illustrates environment 10. However, in FIG. 8B elements of system 16 and various interconnections in some implementations are further illustrated. FIG. 8B shows that user system 12 may include processor system 12A, memory system 12B, input system 12C, and output system 12D. FIG. 8B shows network 14 and system 16. FIG. 8B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers 50₁-50ₙ, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 8A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 8B, system 16 may include a network interface 20 (of FIG. 8A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server 50₁ might be coupled via the network 14 (e.g., the Internet), another application server 50ₙ₋₁ might be coupled via a direct network link, and another application server 50ₙ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

FIG. 9A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

As shown in FIGS. 9A and 9B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 9A and 9B, some implementations of an on-demand database service environment may include anywhere from one to many devices of each type. Also, the on-demand database service environment need not include each device shown in FIGS. 9A and 9B, or may include additional devices not shown in FIGS. 9A and 9B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 9B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 9A and 9B.

FIG. 9B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

In some implementations, the app servers 988 may include a hardware and/or software framework dedicated to the execution of procedures (e.g., programs, routines, scripts) for supporting the construction of applications provided by the on-demand database service environment 900 via the pod 944. In some implementations, the hardware and/or software framework of an app server 988 is configured to cause performance of services described herein, including performance of one or more of the operations of methods described herein with reference to FIGS. 1-7. In alternative implementations, two or more app servers 988 may be included to cause such methods to be performed, or one or more other servers described herein can be configured to cause part or all of the disclosed methods to be performed.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, Calif. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

Some but not all of the techniques described or referenced herein are implemented as part of or in conjunction with a social networking system, also referred to herein as a social network. Social networking systems have become a popular way to facilitate communication among people, any of whom can be recognized as users of a social networking system. One example of a social networking system is Chatter®, provided by salesforce.com, inc. of San Francisco, Calif. salesforce.com, inc. is a provider of social networking services, Customer Relationship Management (CRM) services and other database management services, any of which can be accessed and used in conjunction with the techniques disclosed herein in some implementations. These various services can be provided in a cloud computing environment, for example, in the context of a multi-tenant database system. Thus, the disclosed techniques can be implemented without having to install software locally, that is, on computing devices of users interacting with services available through the cloud. While the disclosed implementations are often described with reference to Chatter®, those skilled in the art should understand that the disclosed techniques are neither limited to Chatter® nor to any other services and systems provided by salesforce.com, inc. and can be implemented in the context of various other database systems and/or social networking systems such as Facebook®, LinkedIn®, Twitter®, Google+®, Yammer® and Jive® by way of example only.

Some social networking systems can be implemented in various settings, including organizations. For instance, a social networking system can be implemented to connect users within an enterprise such as a company or business partnership, or a group of users within such an organization. For instance, Chatter® can be used by employee users in a division of a business organization to share data, communicate, and collaborate with each other for various social purposes often involving the business of the organization. In the example of a multi-tenant database system, each organization or group within the organization can be a respective tenant of the system, as described in greater detail herein.

In some social networking systems, users can access one or more social network feeds, which include information updates presented as items or entries in the feed. Such a feed item can include a single information update or a collection of individual information updates. A feed item can include various types of data including character-based data, audio data, image data and/or video data. A social network feed can be displayed in a graphical user interface (GUI) on a display device such as the display of a computing device as described herein. The information updates can include various social network data from various sources and can be stored in an on-demand database service environment. In some implementations, the disclosed methods, apparatus, systems, and computer-readable storage media may be configured or designed for use in a multi-tenant database environment.

In some implementations, a social networking system may allow a user to follow data objects in the form of CRM records such as cases, accounts, or opportunities, in addition to following individual users and groups of users. The "following" of a record stored in a database, as described in greater detail herein, allows a user to track the progress of that record when the user is subscribed to the record. Updates to the record, also referred to herein as changes to the record, are one type of information update that can occur and be noted on a social network feed such as a record feed or a news feed of a user subscribed to the record. Examples of record updates include field changes in the record, updates to the status of a record, as well as the creation of the record itself. Some records are publicly accessible, such that any user can follow the record, while other records are private, for which appropriate security clearance/permissions are a prerequisite to a user following the record.

Information updates can include various types of updates, which may or may not be linked with a particular record. For example, information updates can be social media messages submitted by a user or can otherwise be generated in response to user actions or in response to events. Examples of social media messages include: posts, comments, indications of a user's personal preferences such as "likes" and "dislikes", updates to a user's status, uploaded files, and user-submitted hyperlinks to social network data or other network data such as various documents and/or web pages on the Internet. Posts can include alpha-numeric or other character-based user inputs such as words, phrases, statements, questions, emotional expressions, and/or symbols. Comments generally refer to responses to posts or to other information updates, such as words, phrases, statements, answers, questions, and reactionary emotional expressions and/or symbols. Multimedia data can be included in, linked with, or attached to a post or comment. For example, a post can include textual statements in combination with a JPEG image or animated image. A like or dislike can be submitted in response to a particular post or comment. Examples of uploaded files include presentations, documents, multimedia files, and the like.

Users can follow a record by subscribing to the record, as mentioned above. Users can also follow other entities such as other types of data objects, other users, and groups of users. Feed tracked updates regarding such entities are one type of information update that can be received and included in the user's news feed. Any number of users can follow a particular entity and thus view information updates pertaining to that entity on the users' respective news feeds. In some social networks, users may follow each other by establishing connections with each other, sometimes referred to as "friending" one another. By establishing such a connection, one user may be able to see information generated by, generated about, or otherwise associated with another user. For instance, a first user may be able to see information posted by a second user to the second user's personal social network page. One implementation of such a personal social network page is a user's profile page, for example, in the form of a web page representing the user's profile. In one example, when the first user is following the second user, the first user's news feed can receive a post from the second user submitted to the second user's profile feed. A user's profile feed is also referred to herein as the user's "wall," which is one example of a social network feed displayed on the user's profile page.

In some implementations, a social network feed may be specific to a group of users of a social networking system. For instance, a group of users may publish a news feed. Members of the group may view and post to this group feed in accordance with a permissions configuration for the feed and the group. Information updates in a group context can also include changes to group status information.

In some implementations, when data such as posts or comments input from one or more users are submitted to a social network feed for a particular user, group, object, or other construct within a social networking system, an email notification or other type of network communication may be transmitted to all users following the user, group, or object in addition to the inclusion of the data as a feed item in one or more feeds, such as a user's profile feed, a news feed, or a record feed. In some social networking systems, the occurrence of such a notification is limited to the first instance of a published input, which may form part of a larger conversation. For instance, a notification may be transmitted for an initial post, but not for comments on the post. In some other implementations, a separate notification is transmitted for each such information update.

The term "multi-tenant database system" generally refers to those systems in which various elements of hardware and/or software of a database system may be shared by one or more customers. For example, a given application server may simultaneously process requests for a great number of customers, and a given database table may store rows of data such as feed items for a potentially much greater number of customers.

An example of a "user profile" or "user's profile" is a database object or set of objects configured to store and maintain data about a given user of a social networking system and/or database system. The data can include general information, such as name, title, phone number, a photo, a biographical summary, and a status, e.g., text describing what the user is currently doing. As mentioned herein, the data can include social media messages created by other users. Where there are multiple tenants, a user is typically associated with a particular tenant. For example, a user could be a salesperson of a company, which is a tenant of the database system that provides a database service.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

The terms "social network feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) generally refers to an item of information, which can be presented in the feed such as a post submitted by a user. Feed items of information about a user can be presented in a user's profile feed of the database, while feed items of information about a record can be presented in a record feed in the database, by way of example. A profile feed and a record feed are examples of different types of social network feeds. A second user following a first user and a record can receive the feed items associated with the first user and the record for display in the second user's news feed, which is another type of social network feed. In some implementations, the feed items from any number of followed users and records can be combined into a single social network feed of a particular user.

As examples, a feed item can be a social media message, such as a user-generated post of text data, and a feed tracked update to a record or profile, such as a change to a field of the record. Feed tracked updates are described in greater detail herein. A feed can be a combination of social media messages and feed tracked updates. Social media messages include text created by a user, and may include other data as well. Examples of social media messages include posts, user status updates, and comments. Social media messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a GUI, for instance, on the user's profile page, as part of the user's profile feed. In contrast to a post, a user status update changes a status of a user and can be made by that user or an administrator. A record can also have a status, the update of which can be provided by an owner of the record or other users having suitable write access permissions to the record. The owner can be a single user, multiple users, or a group.

In some implementations, a comment can be made on any feed item. In some implementations, comments are organized as a list explicitly tied to a particular feed tracked update, post, or status update. In some implementations, comments may not be listed in the first layer (in a hierarchal sense) of feed items, but listed as a second layer branching from a particular first layer feed item.

A "feed tracked update," also referred to herein as a "feed update," is one type of information update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Social media messages and other types of feed updates can be stored as a field or child object of the record. For example, the feed can be stored as a child object of the record.

A "group" is generally a collection of users. In some implementations, the group may be defined as users with a same or similar attribute, or by membership. In some implementations, a "group feed", also referred to herein as a "group news feed", includes one or more feed items about any user in the group. In some implementations, the group feed also includes information updates and other feed items that are about the group as a whole, the group's purpose, the group's description, and group records and other objects stored in association with the group. Threads of information updates including group record updates and social media messages, such as posts, comments, likes, etc., can define group conversations and change over time.

An "entity feed" or "record feed" generally refers to a feed of feed items about a particular record in the database. Such feed items can include feed tracked updates about changes to the record and posts made by users about the record. An entity feed can be composed of any type of feed item. Such a feed can be displayed on a page such as a web page associated with the record, e.g., a home page of the record. As used herein, a "profile feed" or "user's profile feed" generally refers to a feed of feed items about a particular user. In one example, the feed items for a profile feed include posts and comments that other users make about or send to the particular user, and status updates made by the particular user. Such a profile feed can be displayed on a page associated with the particular user. In another example, feed items in a profile feed could include posts made by the particular user and feed tracked updates initiated based on actions of the particular user.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory ("ROM") devices and random access memory ("RAM") devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A database system for identifying recurring sequences of user interactions with an application, the database system comprising:

at least one database storing a plurality of data objects, at least one of the data objects identifying a first plurality of user interactions with an application;
a processor; and
a memory storing instructions configurable to cause:
processing information identifying a second plurality of user interactions with the application, the second user interactions being through a user interface displayed at a computing device;
updating, using the information, at least one of the data objects stored in the at least one database to identify the second user interactions;
identifying a recurring sequence of user interactions from the first user interactions and the second user interactions as causing the application to transition from an identifiable state to a first target state in a recurring sequence of a subset of a plurality of states of the application, the recurring sequence of the subset of states corresponding to a recurring sequence of displayable presentations of pages of the application;
updating at least one of the data objects stored in the at least one database to associate the recurring sequence of user interactions with the first target state of the application; and
configuring the application to display a graphical component in a presentation of a page corresponding to the identifiable state, the graphical component being selectable to cause the application to transition from the identifiable state to the first target state.

2. The database system of claim 1, wherein identifying the recurring sequence of user interactions comprises:
identifying a number of occurrences of the recurring sequence of user interactions; and
determining that the number of occurrences meets or exceeds a designated minimum number of occurrences.

3. The database system of claim 2, wherein identifying the recurring sequence of user interactions further comprises:
determining that each occurrence of the recurring sequence of user interactions occurs within a designated timeframe.

4. The database system of claim 2, wherein identifying the recurring sequence of user interactions further comprises:
determining that the number of occurrences of the recurring sequence of user interactions occurs within a designated timeframe.

5. The database system of claim 1, wherein identifying the recurring sequence of user interactions comprises:
determining that the recurring sequence of user interactions comprises a designated minimum number of user interactions.

6. The database system of claim 1, the user interactions comprising at least one of: a selection of a link, a completion of a field, a request to perform a search, a keystroke, a sequence of keystrokes, a change in a scroll position of the user interface, a finger gesture, a sequence of finger gestures, a mouse gesture, a sequence of mouse gestures, or a change in a zoom level of the user interface.

7. The database system of claim 1, the first target state of the application defined at least in part by at least one of: an associated uniform resource locator (URL), a scroll position for the user interface, or a zoom level for the user interface.

8. The database system of claim 1, the instructions further configurable to cause:
providing for display in the user interface a prompt to display a user interface element associated with the first target state of the application;
receiving a request to display the user interface element; and
generating an update to the user interface for displaying the first target state.

9. The database system of claim 8, wherein the update is in the form of the user interface element provided for display in a navigation user interface component of the user interface.

10. The database system of claim 9, the instructions further configurable to cause:
receiving a selection of the user interface element; and
providing for display in the user interface the first target state of the application.

11. The database system of claim 8, the instructions further configurable to cause:
receiving a request to edit the first target state, the request comprising an update to the recurring sequence of user interactions; and
updating the first target state in accordance with the request to edit the first target state.

12. The database system of claim 1, wherein identifying the recurring sequence of user interactions comprises:
identifying the recurring sequence as one of a plurality of recurring sequences each having a respective count of user interactions; and
determining, based on the identification of the recurring sequence as one of the plurality of recurring sequences, a usability level for the application.

13. The database system of claim 1, the first target state being associated with the first user of the application, the at least one database including data objects associating a second target state with a second user of the application.

14. The database system of claim 1, the application being one of a web application, a mobile application, a tablet application, or a desktop application.

15. A computing device comprising:
a display device;
at least one storage medium storing a plurality of data objects, at least one of the data objects identifying a first plurality of user interactions with an application; and
one or more processors configurable to cause:
processing information identifying a second plurality of user interactions with the application, the second user interactions being through a user interface displayed on the display device;
updating, using the information, at least one of the data objects stored in the at least one storage medium to identify the second user interactions;
identifying a recurring sequence of user interactions from the first user interactions and the second user interactions as in causing the application to transition from an identifiable state to a first target state in a recurring sequence of a subset of a plurality of states of the application, the recurring sequence of the subset of states corresponding to a recurring sequence of displayable presentations of pages of the application;
updating at least one of the data objects stored in the at least one storage medium to associate the recurring sequence of user interactions with the first target state of the application; and
configuring the application to display a graphical component in a presentation of a page corresponding to the identifiable state, the graphical component being selectable to cause the application to transition from the identifiable state to the first target state.

16. The computing device of claim 15, the computing device being one of: a smartphone, a tablet, a wearable device, a touchscreen device, a laptop computer, or a desktop computer.

17. The computing device of claim 15, the computing device being configured to receive input via a touchscreen, a pointing device, a mouse, a stylus, a gesture or motion input, or a voice command.

18. A method comprising:
providing a database system associated with at least one database storing a plurality of data objects at least one of which identifies a first plurality of user interactions with an application;
processing information identifying a second plurality of user interactions with the application, the second user interactions being through a user interface displayed at a computing device;
causing updating, using the information, of at least one of the data objects stored in the at least one database to identify the second user interactions;
identifying a recurring sequence of user interactions from the first user interactions and the second user interactions as causing the application to transition from an identifiable state to a first target state in a recurring sequence of a subset of a plurality of states of the application, the recurring sequence of the subset of states corresponding to a recurring sequence of displayable presentations of pages of the application;
causing updating of at least one of the data objects stored in the at least one database to associate the recurring sequence of user interactions with the first target state of the application; and
configuring the application to display a graphical component in a presentation of a page corresponding to the identifiable state, the graphical component being selectable to cause the application to transition from the identifiable state to the first target state.

19. The method of claim 18, the method further comprising:
generating, in a navigation user interface component of the user interface, a user interface element associated with the first target state of the application;
receiving a selection of the user interface element; and
providing for display in the user interface the first target state of the application.

20. A computer program product comprising program code to be executed by at least one processor when retrieved from a non-transitory computer-readable medium, the program code comprising instructions configurable to cause:
accessing at least one database storing a plurality of data objects, at least one of the data objects identifying a first plurality of user interactions with an application;
processing information identifying a second plurality of user interactions with the application, the second user interactions being through a user interface displayed at a computing device;
updating, using the information, at least one of the data objects stored in the at least one database to identify the second user interactions;
identifying a recurring sequence of user interactions from the first user interactions and the second user interactions as causing the application to transition from an identifiable state to a first target state in a recurring sequence of a subset of a plurality of states of the application, the recurring sequence of the subset of states corresponding to a recurring sequence of displayable presentations of pages of the application;
updating at least one of the data objects stored in the at least one database to associate the recurring sequence of user interactions with the first target state of the application; and
configuring the application to display a graphical component in a presentation of a page corresponding to the identifiable state, the graphical component being selectable to cause the application to transition from the identifiable state to the first target state.

* * * * *